United States Patent
Fresko

(10) Patent No.: US 7,124,291 B1
(45) Date of Patent: Oct. 17, 2006

(54) SYSTEM AND METHOD FOR ELIMINATING STATIC INITIALIZATION OVERHEAD BY MEMORY SPACE CLONING OF A MASTER RUNTIME SYSTEM PROCESS

(75) Inventor: Nedim Fresko, San Francisco, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 427 days.

(21) Appl. No.: 10/745,021

(22) Filed: Dec. 22, 2003

(51) Int. Cl.
*G06F 15/177* (2006.01)
(52) U.S. Cl. ............................................... 713/1; 718/1
(58) Field of Classification Search ................... 713/1; 718/1
See application file for complete search history.

(56) References Cited

U.S. PATENT DOCUMENTS

| | | | |
|---|---|---|---|
| 6,272,674 B1 * | 8/2001 | Holiday, Jr. ................. 717/174 |
| 6,374,286 B1 * | 4/2002 | Gee et al. ..................... 718/108 |
| 6,457,019 B1 * | 9/2002 | Sexton et al. ............ 707/103 R |
| 6,711,657 B1 * | 3/2004 | Sexton et al. ................. 711/170 |
| 6,823,509 B1 * | 11/2004 | Webb .............................. 718/1 |
| 6,829,761 B1 * | 12/2004 | Sexton et al. ................. 717/165 |
| 6,854,114 B1 * | 2/2005 | Sexton et al. .................... 718/1 |
| 2002/0129078 A1 * | 9/2002 | Plaxton et al. .................. 709/1 |
| 2003/0088604 A1 * | 5/2003 | Kuck et al. ..................... 709/1 |

* cited by examiner

*Primary Examiner*—Chun Cao
(74) *Attorney, Agent, or Firm*—Park, Vaughan & Fleming, LLP

(57) ABSTRACT

A system and method for eliminating static initialization overhead by memory space cloning of a master runtime system process is presented. A master runtime system process is executed. One or more static initialization methods are identified. Each static initialization method is uniquely associated with a class provided in a runtime system and specifies a source definition provided as object-oriented program code. At least one static initialization method is executed in a memory space of the master runtime system process. The memory space is cloned as a child runtime system process responsive to a process request. The child runtime system process is executed. In one embodiment, a full garbage collection is performed by promoting objects created during static initialization into the older generation.

22 Claims, 10 Drawing Sheets

120

140

SYSTEM AND METHOD FOR ELIMINATING STATIC INITIALIZATION OVERHEAD BY MEMORY SPACE CLONING OF A MASTER RUNTIME SYSTEM PROCESS

FIELD OF THE INVENTION

The invention relates in general to eliminating static initialization overhead and, in particular, to a system and method for eliminating static initialization overhead by memory space cloning of a master runtime system process.

BACKGROUND OF THE INVENTION

Recent advances in microprocessor design and component integration have enabled a wide range of devices to offer increasingly complex functionality and "soft" features. Soft features include software applications that enhance and customize the operation of a device. These devices include standard computing devices, such as desktop and laptop computers, portable computing devices, such as personal data assistants, and consumer devices, such as cellular telephones, messaging pagers, gaming consoles, and set top boxes. Most devices now include an operating system to support the soft features and other extensions.

The increased capabilities offered by these software-upgradeable devices have also created certain user expectations. Often, users are not technically savvy and are intolerant of performance compromises occasioned by architectural challenges, such as slow or inconsistent application performance. Similarly, users generally expect to be able to access a host of separate applications, which are implemented at the system level through multitasking. For users, widely available software applications assure a positive experience through consistency and increased exposure across multiple platforms. However, for software developers, engineering software applications for disparate computing platforms entails increased development costs and on-going support and upgrade commitments for each supported architecture.

Managed code platforms provide one solution to software developers seeking to support multiple platforms by presenting a machine-independent and architecture-neutral operating environment. Managed code platforms include programming language compilers and interpreters executed by an operating system as user applications, but which provide virtual runtime environments within which compatible applications can operate. For instance, applications written in the Java programming language, when combined with a Java virtual machine (JVM) runtime environment, can operate on heterogeneous computer systems independent of machine-specific environment and configuration settings. An overview of the Java programming language is described in P. van der Linden, "Just Java," Ch. 1, Sun Microsystems, Inc. (2d ed. 1997), the disclosure of which is incorporated by reference. JVMs are a critical component to the overall Java operating environment, which can be ported to the full range of computational devices, including memory-constrained consumer devices.

Managed code platforms are generally designed for the monotonic execution of a single application instance. Multiple instances of a managed code platform are executed to simulate multitasking behavior. Such forced concurrency, however, creates several performance problems. First, each instance incurs a startup transient. Executable and startup data must be read from slow persistent storage, which results in slow initial application performance. Similarly, memory is not shared between instances and each additional instance increases the overall memory footprint of the platform by separately loading and instantiating classes, generally problematic in memory-constrained systems. Moreover, data dependencies and deferred initialization of system state can result in non-deterministic execution patterns. Finally, each instance independently determines the relative importance of executing methods and compiles machine code on an ad hoc basis, often causing inconsistent application performance.

One solution to providing concurrently executable managed code platforms involves designating a managed code platform that executes as a master process. Individual child managed code platform processes are spawned from the master process using process cloning and inherit runtime state from the master managed code platform. As a result, each child process benefits from the initialization actions completed by the master process. However, at runtime, static initialization methods can still degrade individual child process performance. Static initialization methods are executed when a class is first used by a running program through, for instance, a static method call, static field access, or instantiation of an instance of the class. As a result, static initialization methods can cause non-deterministic execution and impact child process startup times. In addition, although each static initialization method is only executed once, the code often remains in memory and can increase the memory footprint.

Therefore, there is a need for an approach to performing static initialization methods in a master runtime system process executing in a concurrent managed code platform, such as the Java operating environment. Preferably, such an approach would execute the static initialization methods at boot time and eliminate unnecessary overhead by freeing storage used by the completed static initialization methods. Subsequent cloned child processes would inherit the memory state of the master runtime system process reflecting the effects of the pre-executed static initializers.

SUMMARY OF THE INVENTION

A managed code platform is executed in an application framework that supports the spawning of multiple and independent isolated user applications. Preferably, the application framework supports the cloning of the memory space of each user application using copy-on-write semantics. The managed code platform includes a master runtime system process, such as a virtual machine, to interpret machine-portable code defining compatible applications. An application manager also executes within the application framework and is communicatively interfaced to the master runtime system process through an inter-process communication mechanism. The application framework logically copies the master runtime system process context upon request by the application framework to create a child runtime system process through process cloning. The context of the master runtime system process stored in memory is inherited by the child runtime system process as prewarmed state. When implemented with copy-on-write semantics, the process cloning creates a logical copy of references to the master runtime system process context. Segments of the referenced master runtime system process context are lazily copied only upon an attempt by the child runtime system process to modify the referenced context. In addition, static initialization methods defined on classes and classes defined in the class libraries are executed by the master runtime system process at device boot time. Each static initialization method can contain program code for performing a full range of operations. Thereafter, each subsequently spawned child system process inherits the prewarmed state of the master runtime system process, including the accumulation of the side effects of all of the static initialization method executions. Preferably, portions of the master runtime system process memory state created through static initialization remain read only and are shared between the master runtime system process and child runtime system processes. An example of a suitable managed code platform and runtime system process are the Java operating environment and Java virtual machine (JVM) architecture, as licensed by Sun Microsystems, Inc., Palo Alto, Calif.

One embodiment provides a system and method for eliminating static initialization overhead by memory space cloning of a master runtime system process is presented. A master runtime system process is executed. One or more static initialization methods are identified. Each static initialization method is uniquely associated with a class provided in a runtime system and specifies a source definition provided as object-oriented program code. At least one static initialization method is executed in a memory space of the master runtime system process. The memory space is cloned as a child runtime system process responsive to a process request. The child runtime system process is executed.

The use of the process cloning mechanism provided by the underlying application framework provides several benefits in addition to resolving the need for efficient concurrent application execution of machine portable code. The inheritance of prewarmed state through the cloning of the runtime master process context provides inter-process sharing of the accumulated side effects of all of the static initialization method executions. Similarly, each child runtime system process executes in isolation of each other process, thereby providing strong resource control through the system level services of the application framework. Isolation, reliable process invocation and termination, and resource reclamation are available and cleanly provided at an operating system level. In addition, process cloning provides fast user application initialization and deterministic runtime behavior, particularly for environments providing process cloning with copy-on-write semantics. Finally, for non-shareable segments of the master runtime system process context, actual copying is deferred until required through copy-on-write semantics, which avoids impacting application performance until, and if, the segment is required.

Still other embodiments of the invention will become readily apparent to those skilled in the art from the following detailed description, wherein are described embodiments of the invention by way of illustrating the best mode contemplated for carrying out the invention. As will be realized, the invention is capable of other and different embodiments and its several details are capable of modifications in various obvious respects, all without departing from the spirit and the scope of the invention. Accordingly, the drawings and detailed description are to be regarded as illustrative in nature and not as restrictive.

DETAILED DESCRIPTION

System Overview

Figure 1:
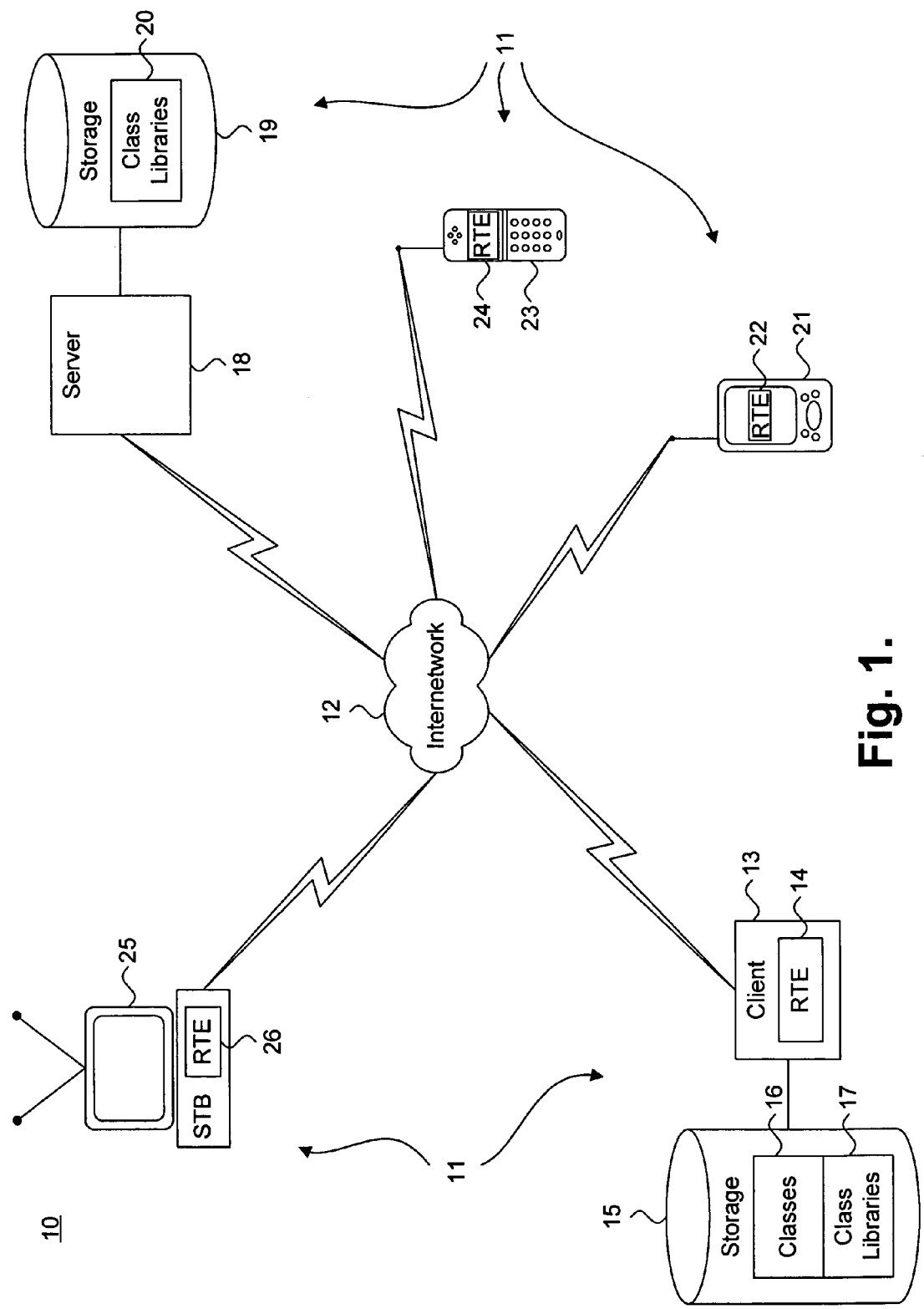
FIG. 1 is a functional block diagram showing, by way of example, runtime environments implemented on a plurality of heterogeneous devices.

FIG. 1 is a functional block diagram 10 showing, by way of example, runtime environments (RTES) 14, 22, 24, 26 implemented on a plurality of heterogeneous devices 11. Each heterogeneous device 11 provides a managed code platform, such as the Java operating environment, executing in a runtime environment 14, 22, 24, 26, as further described below with reference to FIG. 2. The heterogeneous devices 11 include, nonexclusively, a client computer system 13, such as a desktop or laptop computer system. Each client 13 is operatively coupled to a storage device 15 and maintains a set of classes 16 and class libraries 17, which respectively define code modules that specify data structures and sets of methods that operate on the data, and shareable collections of the modules. The heterogeneous devices 11 also include portable computing devices, including personal data assistants 21, and consumer devices, such as cellular telephones 23 and set top boxes (STB) 25. Finally, a server 18 is operatively coupled to a storage device 19 in which globally shareable class libraries 20 are maintained. Each of the heterogeneous devices 11 can interface via a network 12, which includes conventional hardwired and wireless network configurations. Other types of heterogeneous devices 11 and various network configurations, arrangements, and topologies are possible.

Each heterogeneous device 11 includes an operating system to manage resources, provide access to peripheral devices, allocate memory resources, and control program execution and termination. Each operating system supports a process cloning mechanism that spawns multiple and independent isolated user applications by cloning the memory space of specifiable processes. An example of a process cloning mechanism suitable for use in the present invention is the fork( ) system call provided by the Unix or Linux operating systems, such as described in M. J. Bach, "The Design Of The Unix Operating System," Ch. 7, Bell Tele. Labs., Inc. (1986), the disclosure of which is incorporated by reference. The process invoking the fork( ) system call is known as the parent process and the newly created process is called the child process. The operating system assigns a separate process identifier to the child process, which executes as a separate process. The operating system also creates a logical copy of the context of the parent process by copying the memory space of the parent process into the memory space of the child process. In a copy-on-write variant of the fork( ) system call, the operating system only copies references to the memory space and defers actually copying individual memory space segments until, and if, the child process attempts to modify the referenced data of the parent process context. The copy-on-write fork( ) system call is faster than the non-copy-on-write fork( ) system call and implicitly shares any data not written into between the parent and child processes.

System for Eliminating Static Initialization Overhead

Figure 2:
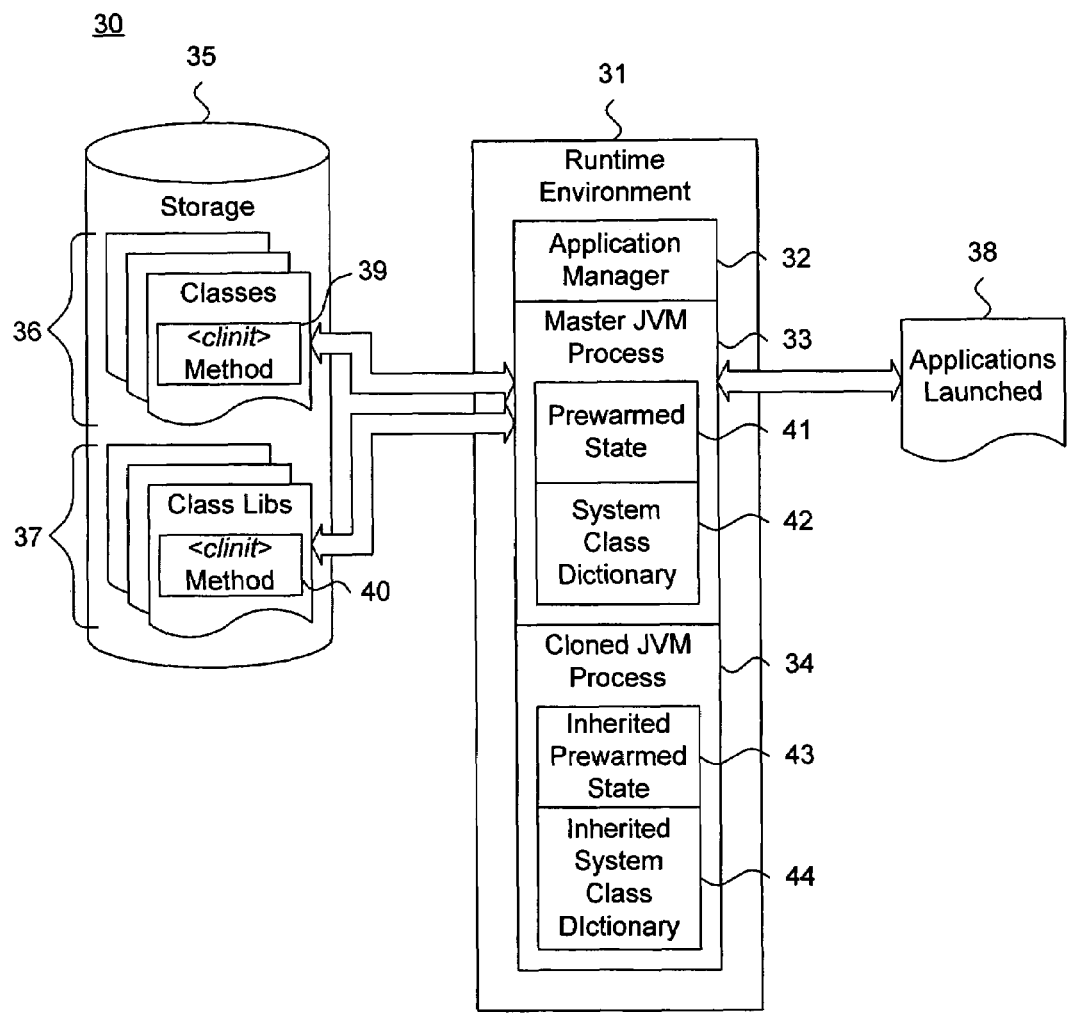
FIG. 2 is a block diagram showing a system for eliminating static initialization overhead by memory space cloning of a master runtime system process, in accordance with the invention.

FIG. 2 is a block diagram 30 showing a system for eliminating static initialization overhead by memory space cloning of a master runtime system process 34, in accordance with the invention. The system consists of a runtime environment 31 and individual classes 36 and class libraries 37 that form the overall core managed code platform. By way of example, the system is described with reference to the Java operating environment, although other forms of managed code platforms that execute applications preferably written in an object oriented programming language, such as the Java programming language, could also be used.

The exemplary runtime environment 31 includes an application manager 32, master Java virtual machine (JVM) process 33 and zero or more cloned JVM processes 34. The master JVM process 33 and cloned JVM processes 34 respectively correspond to a master runtime system process and child runtime system processes. The master runtime system process, preferably provided as a virtual machine, interprets machine-portable code defining compatible applications. The runtime environment 31 need not execute cloned JVM processes 34, which are only invoked upon request by the application manager 32.

The runtime environment 31 executes an application framework that spawns multiple independent and isolated user application process instances by preferably cloning the memory space of a master runtime system process. The example of an application framework suitable for use in the present invention is the Unix operating system, such as described generally in M. J. Bach, supra at Ch. 2, the disclosure of which is incorporated by reference.

The application manager 32 presents a user interface through which individual applications can be selected and executed. The application manager 32 and master JVM process 33 preferably communicate via an inter-process communication (IPC) mechanism, such as a pipe or a socket. The master JVM process 33 is started at device boot time.

Upon initialization, the master JVM process 33 reads an executable process image from the storage device 35 and performs bootstrapping operations. These operations include executing static initialization methods, known as <clinit> methods, as further described below. Thus, upon completion of static initialization, the memory image of the master JVM process 33 resembles that of an initialized, primed and warmed up JVM process that contains the accumulated side effects of all of the static initialization method executions.

Following the initialization, the master JVM process 33 idles, that is, "sleeps" in an inactive state, while awaiting further instructions from the application manager 32. The master JVM process 33 awakens in response to requests received from the application manager 32 to execute applications. The application manager 32 sends a request to the master JVM process 33, including standard command line parameters, such as application name, class path, and application arguments. The master JVM process 33 awakens and creates a cloned JVM process 34 as a new cloned process instance of the master JVM process 33 using the process cloning mechanism of the underlying operating system. The context of the master JVM process 33 stored in memory as prewarmed state 41 and system class dictionary 42 is inherited by the cloned JVM process 34 as inherited prewarmed state 43 and inherited system class dictionary 44, thereby saving initialization and runtime execution times and providing deterministic execution behavior. Following the "cloning" of the cloned JVM process 34, the master JVM process 33 records the launched application in an applications launched list 38 and returns to an inactive sleep state.

When implemented with copy-on-write semantics, the process cloning creates a logical copy of only the references to the master JVM process context. Segments of the referenced master JVM process context are lazily copied only upon an attempt by the cloned JVM process to modify the referenced context. Therefore, as long as the cloned JVM process does not write into a memory segment, the segment remains shared between parent and child processes.

The master JVM process 33 recognizes the following basic commands received from the application manager 32 through the IPC mechanism:

(1) list: Provides a list of applications launched in response to requests received from the application manager 32.

(2) jexec: Invokes the process cloning mechanism, parses command line arguments and executes a new instance of the master JVM process 33 as the cloned JVM process 34. Preferably adopts a syntax compatible to standard JVM processes.

(3) kill: Terminates the application identified by an application handle or process identifier.

Other commands are possible, such as described in commonly-assigned U.S. patent application Ser. No. 10/745,164, entitled "System And Method For Performing Incremental Initialization Of A Master Runtime System Process," filed 22 Dec. 2003, the disclosure of which is incorporated by reference.

Each of the classes 36 and classes defined in the class libraries 37 has one static initialization method, <clinit> method 39, 40, respectively defining all static initialization for the class. Each <clinit> method 39, 40 contains program code for performing a full range of operations, which are executed when a class is first used by a running application through, for instance, a static method call, static field access, or instantiation of an instance of the class.

During initialization, the master JVM process 33 executes the <clinit> method 39, 40 assigned to each class 36 and class defined in the class libraries 37. Any effects on the master JVM process context resulting from the execution of the <clinit> methods 39, 40 refine or "enrich" the prewarmed state 41 of the master JVM process 33, such that subsequently cloned JVM processes 34 spawned from the master JVM process 33 will inherit the refined context. The prewarmed state 41 is an accumulation of the side effects of all of the static initialization method executions that were completed prior to the first cloned JVM process 34 being instantiated. Side effects include, for example, memory allocations and setup, data structure creation and population, variable initializations, and similar operations that can be performed by arbitrary code associated with each <clinit> method 39, 40. Preferably, portions of the master JVM process memory state created by executing the <clinit> methods 39, 40 remain read only and are shared between the master JVM process 33 and cloned JVM processes 34.

The <clinit> methods 39, 40 are only executed once and, once successfully initialized, are no longer required. In a further embodiment, following successful static initialization method execution, the storage associated with each <clinit> method 39, 40 is freed, including code and metadata. The inherited prewarmed state 43 of each cloned JVM process 34 is thereby reduced.

In a still further embodiment, the master JVM process 33 can include internal data structures to indicate that the classes associated with the executed <clinit> methods 39, 40 have already been initialized. Each subsequently spawned cloned JVM process 34 will inherit the prewarmed state 41 of the master JVM process 33 and, by referring to the internal data structures, can skip performing further static initializations. As a result, the first use of each initialized class will be as efficient as all subsequent uses of the class and will provide more overall deterministic execution.

In a still further embodiment, the master JVM process 33 and each cloned JVM process 34 utilize generational garbage collection. Under a generational garbage collection scheme, the garbage collector segregates newly-created objects into an object nursery based on the premise that most objects are temporary and need memory space only for a short time. Following garbage collection, the garbage collector promotes any longer lived objects from the object nursery into an older generation identified separately from the object nursery.

The master JVM process 33 executes all of the <clinit> methods 39, 40, after which a full garbage collection is performed and the objects created during static initialization are promoted into the older generation. Most allocation and garbage collection occurs in the object nursery. Accordingly, promoting the static initialization objects out of the object nursery and into the older generation decreases the likelihood that a subsequently-spawned cloned JVM process 34 will modify the memory space in which the older generation static initialization objects are stored. Static initialization object promotion will thus facilitate further sharing of prewarmed state between the master JVM process 33 and cloned JVM processes 34, particularly with process cloning using copy-on-write semantics.

Master JVM Process Mapping

Figure 3:
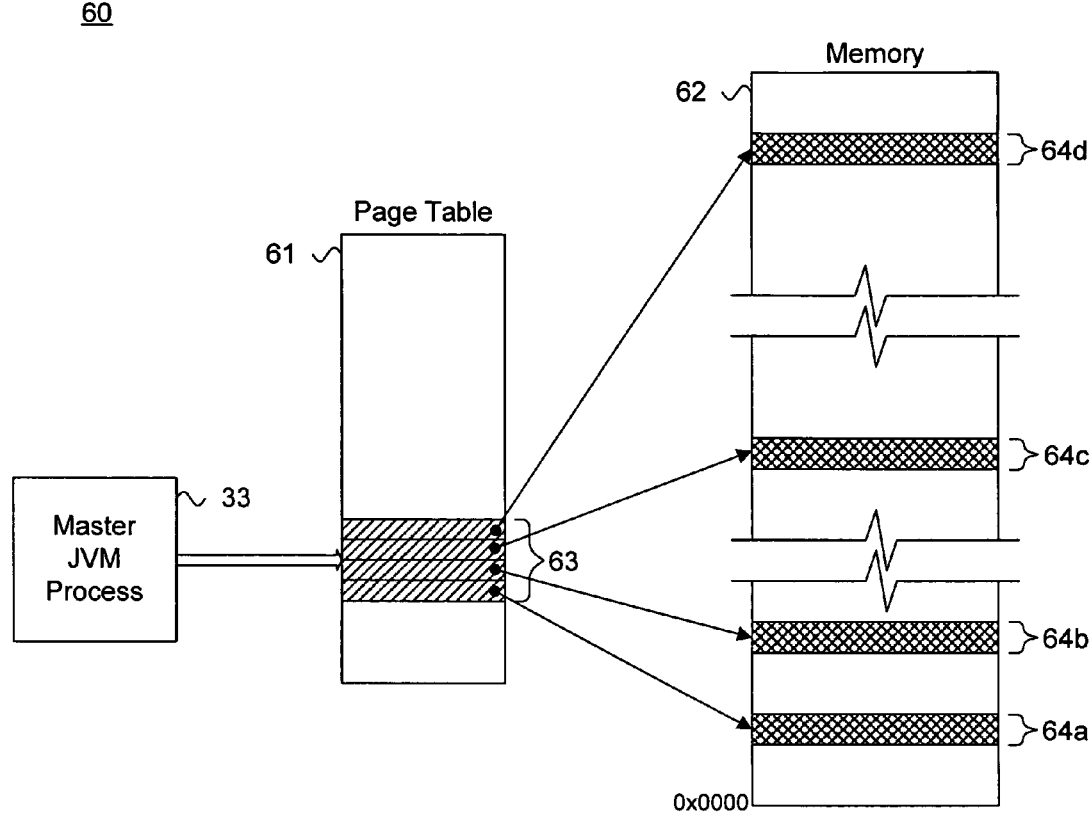
FIG. 3 is a block diagram showing, by way of example, a master JVM process mapped into a page table.

FIG. 3 is a block diagram 60 showing, by way of example, a master JVM process 33 mapped into memory 62. Generally, the context for an executing process includes a data space, user stack, kernel stack, and a user area that lists open files, current directory and supervisory permission settings. Other types of context can also be provided. The context is stored and managed in the memory 62 by the operating system. At device boot time, the operating system instantiates a representation of the executable master JVM process 33 into the memory 62, possibly in non-contiguous pages 64*a–d*, and records the allocation of the memory space as page table entries 63 into the page table 61 prior to commencing execution of the master JVM process 33. As well, the master JVM process context could similarly be mapped using other memory management systems, such as using demand paging, swapping and similar process memory allocation schemes compatible with process cloning, particularly process cloning with copy-on-write semantics.

Cloned JVM Process Mapping

Figure 4:
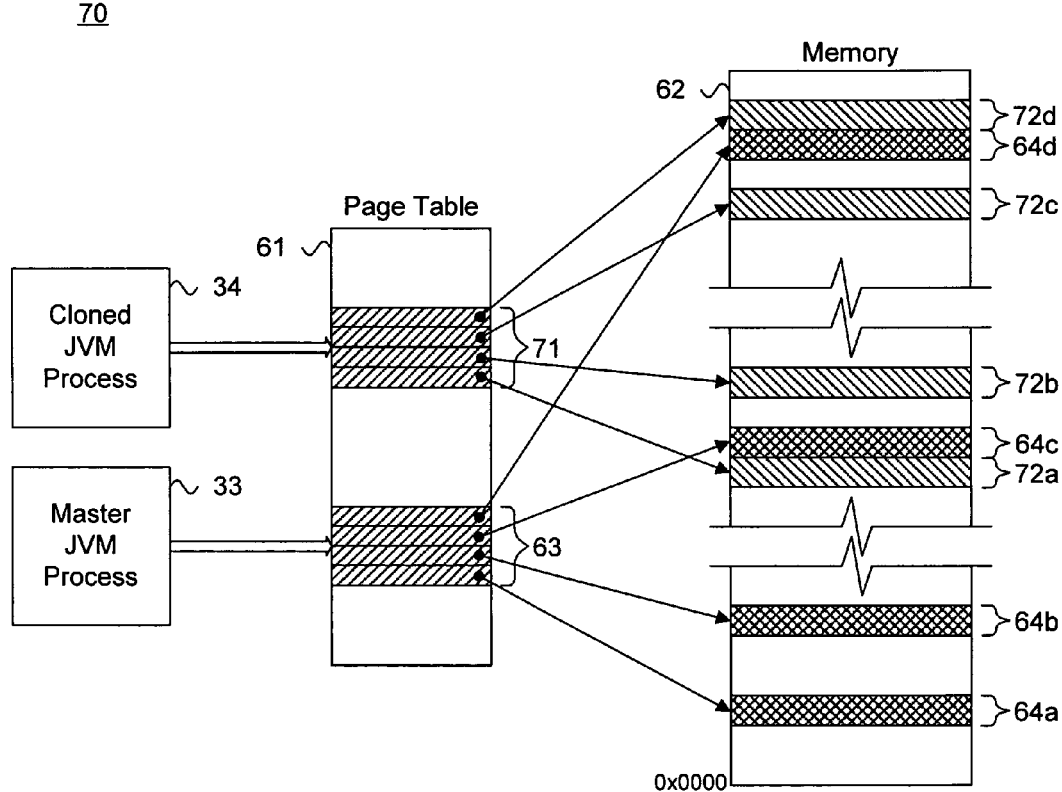
FIG. 4 is a block diagram showing, by way of example, a master JVM process and a cloned JVM process mapped into a page table through memory space cloning.

FIG. 4 is a block diagram 70 showing, by way of example, a master JVM process 33 and a cloned JVM process 34 mapped into memory 62 through memory space cloning. In a system with process cloning that does not provide copy-on-write semantics, physical copies of the pages 64*a–c* in the memory 62 storing the parent process context are created for each child process. In response to a process cloning request, the operating system instantiates a copy of the representation of the executable master JVM process 33 for the cloned JVM process 34 into the memory 62, possibly in non-contiguous pages 72*a–d*, and records the allocation of the memory space as page table entries 71 into the page table 61 prior to commencing execution of the cloned JVM process 34. Thus, the cloned JVM process 34 is created with a physical copy of the context of the master JVM process 33. Since a new, separate physical copy of the master JVM process context is created, the cloned JVM process 34 inherits the prewarmed state 41, including the preloaded classes of the master JVM process 33. However, the overall memory footprint of the runtime environment 31 is increased by the memory space required to store the additional copy of the master JVM process context.

Cloned JVM Process Mapping with Copy-On-Write

Figure 5A:
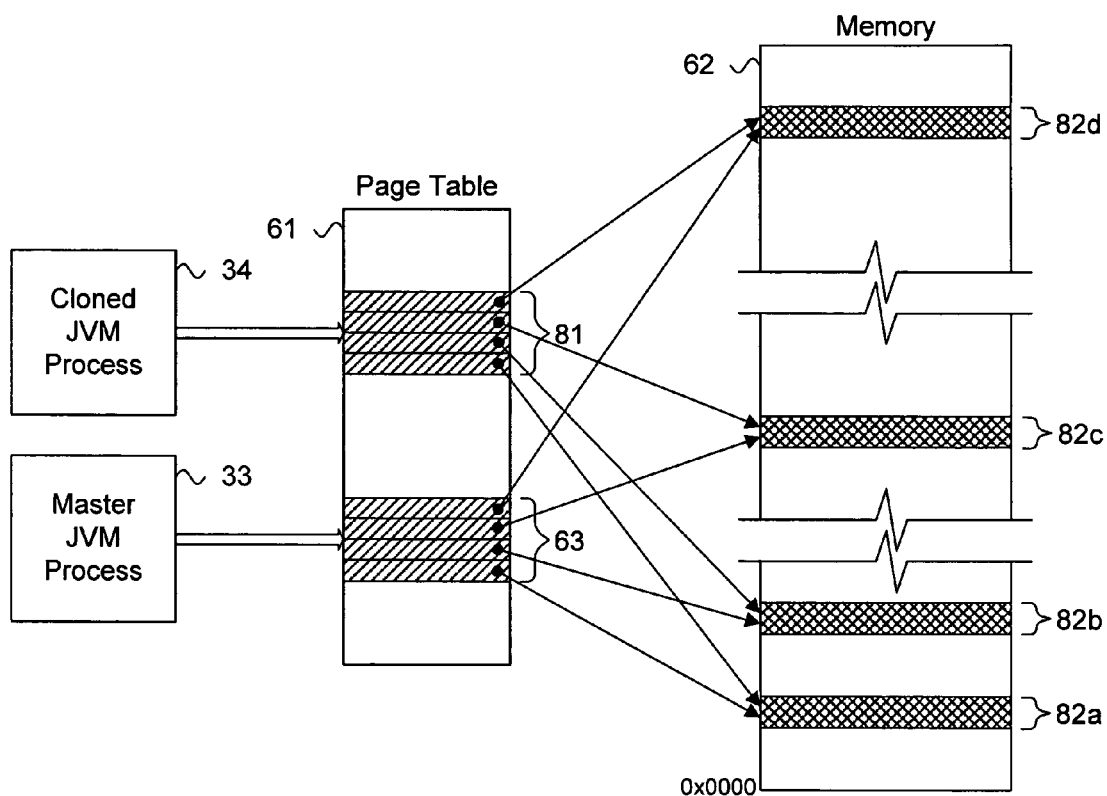
FIGS. 5A–B are block diagrams showing, by way of example, a master JVM process and a cloned JVM process mapped into a page table through memory space cloning with copy-on-write semantics.
Figure 5B:
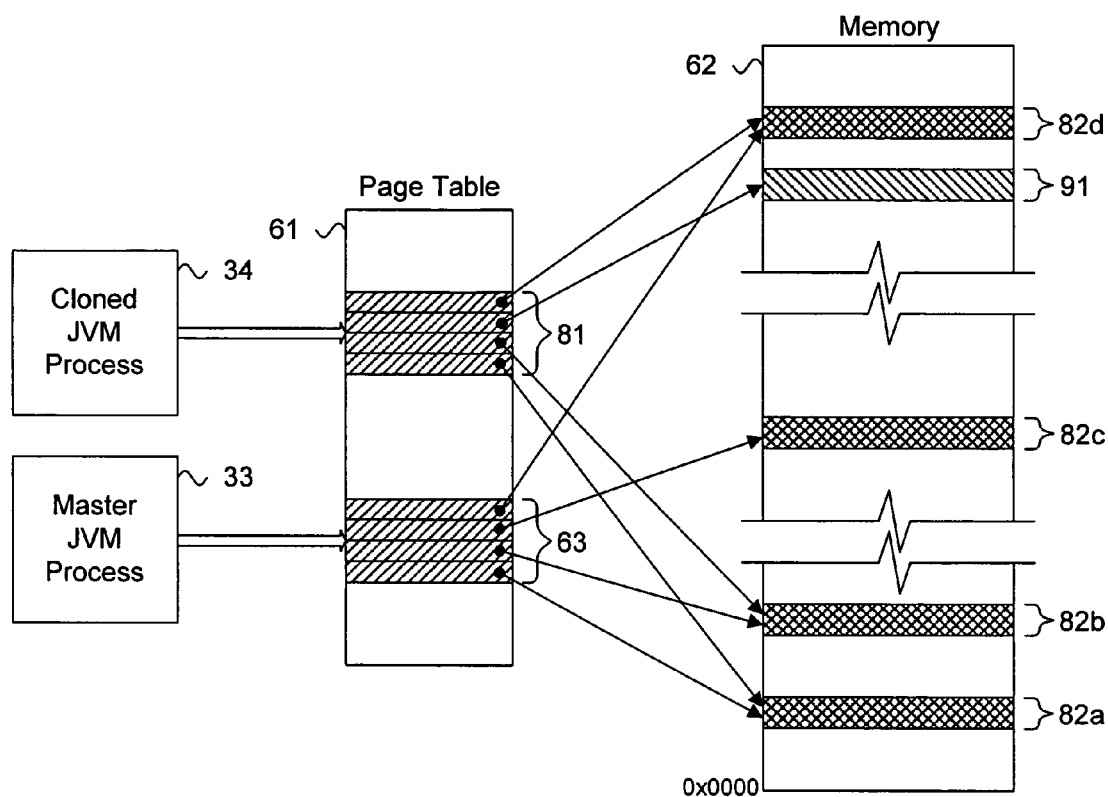

FIGS. 5A–B are block diagrams 80, 90 showing, by way of example, a master JVM process 33 and a cloned JVM process 34 mapped into memory 62 through memory space cloning with copy-on-write semantics. In a system with process cloning that provides copy-on-write semantics, only copies of the references, typically page table entries, to the memory space storing the parent process context are created for each child process. Referring first to FIG. 5A, in response to a process cloning request, the operating system copies only the page table entries 63 referencing the memory space of the executable master JVM process 33 as a new set of page table entries 81 for the cloned JVM process 34. Thus, the cloned JVM process 34 uses the same references to the possibly non-contiguous pages 64*a–d* storing the master JVM process context as the master JVM process 34. Initialization and execution of the application associated with the cloned JVM process 34 requires less time, as only the page table entries 62 are copied to clone the master JVM process context. Furthermore, until the cloned JVM process 34 attempts to modify the master JVM process context, the memory space is treated as read only data, which can be shared by other processes.

Referring next to FIG. 5B, the cloned JVM process 34 has attempted to modify one of the pages 82*c* in the memory space of the master JVM process context. In response, the operating system creates a physical copy of the to-be-modified memory space page 82*c* as a new page 91 and updates the allocation in the page table entries 81 for the cloned JVM process 34. Through copy-on-write semantics, the overall footprint of the runtime environment 31 is maintained as small as possible and only grows until, and if, each cloned JVM process 34 actually requires additional memory space for application-specific context.

Method for Eliminating Static Initialization Overhead

Figure 6:
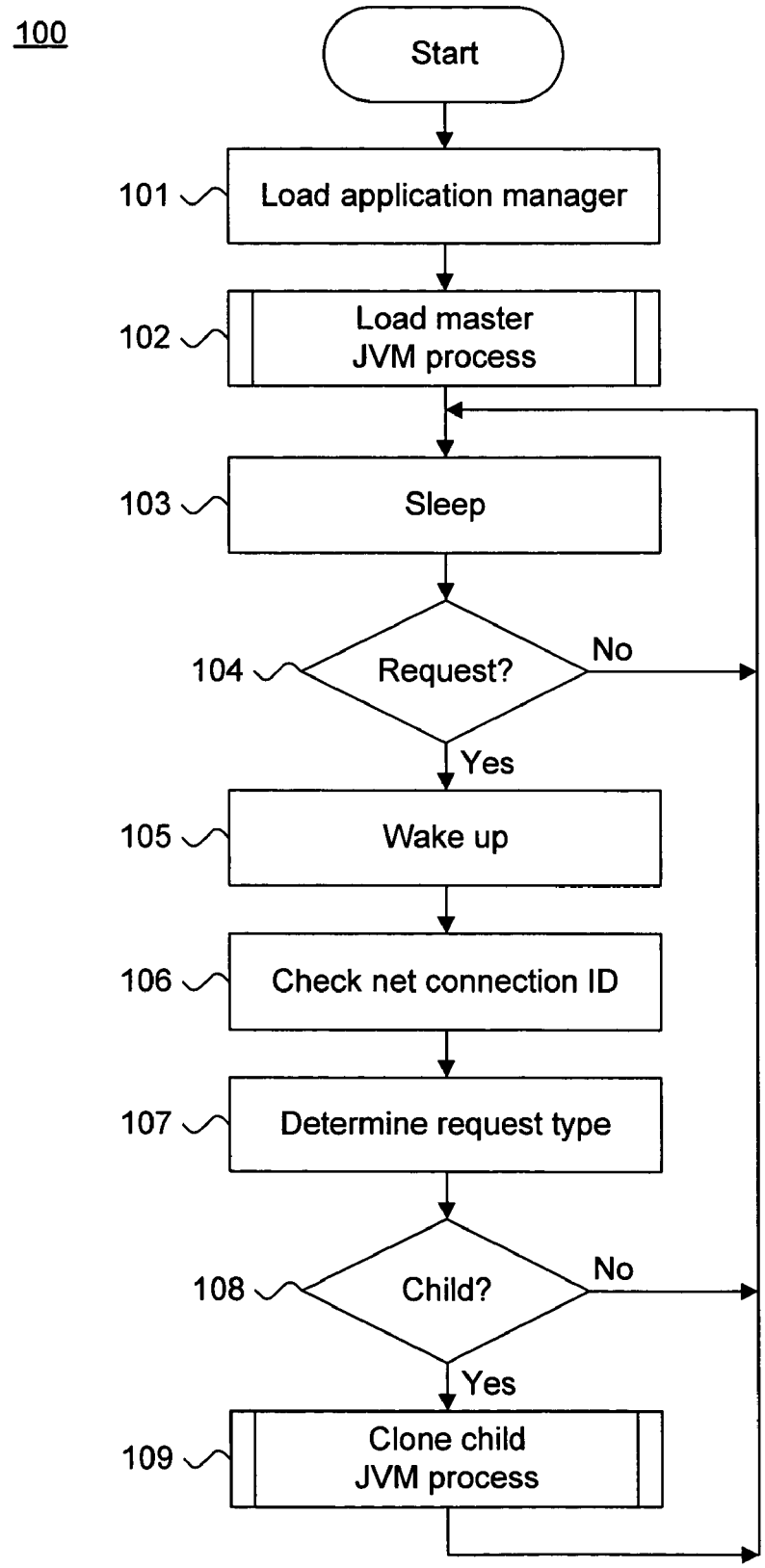
FIG. 6 is a flow diagram showing a method for eliminating static initialization overhead by memory space cloning of a master runtime system process, in accordance with the invention.

FIG. 6 is a flow diagram, showing a method 100 for eliminating static initialization overhead by memory space cloning of a master runtime system process 34, in accordance with the invention. The method 100 is described as a sequence of process operations or steps, which can be executed, for instance, by the runtime environment 31 of FIG. 2 or other components.

Initially, the application manager 32 is loaded (block 101). The master JVM process 33 is loaded and initialized at device boot time (block 102), as further described below with reference to FIG. 7. Following loading and initialization, the master JVM process 33 enters an inactive sleep mode (block 103). Upon receiving a request from the application manager 32 (block 104), the master JVM process 33 awakens (block 105). If necessary, the master JVM process 33 checks the network connection identifier (ID) (block 106) for the application manager 32 and determines the type of request (block 107). The master JVM process 33 recognizes the commands list, jexec, and kill, as described above with reference to FIG. 2. If the request type corresponds to a jexec request, instructing the master JVM process 33 to initiate an execution of an application through process cloning (block 108), a cloned JVM process 34 is cloned and executed (block 109), as further described below with reference to FIGS. 8 and 9. Processing continues indefinitely until the master JVM process 33 and the runtime environment 31 are terminated.

Routine for Loading Master JVM Process

Figure 7:
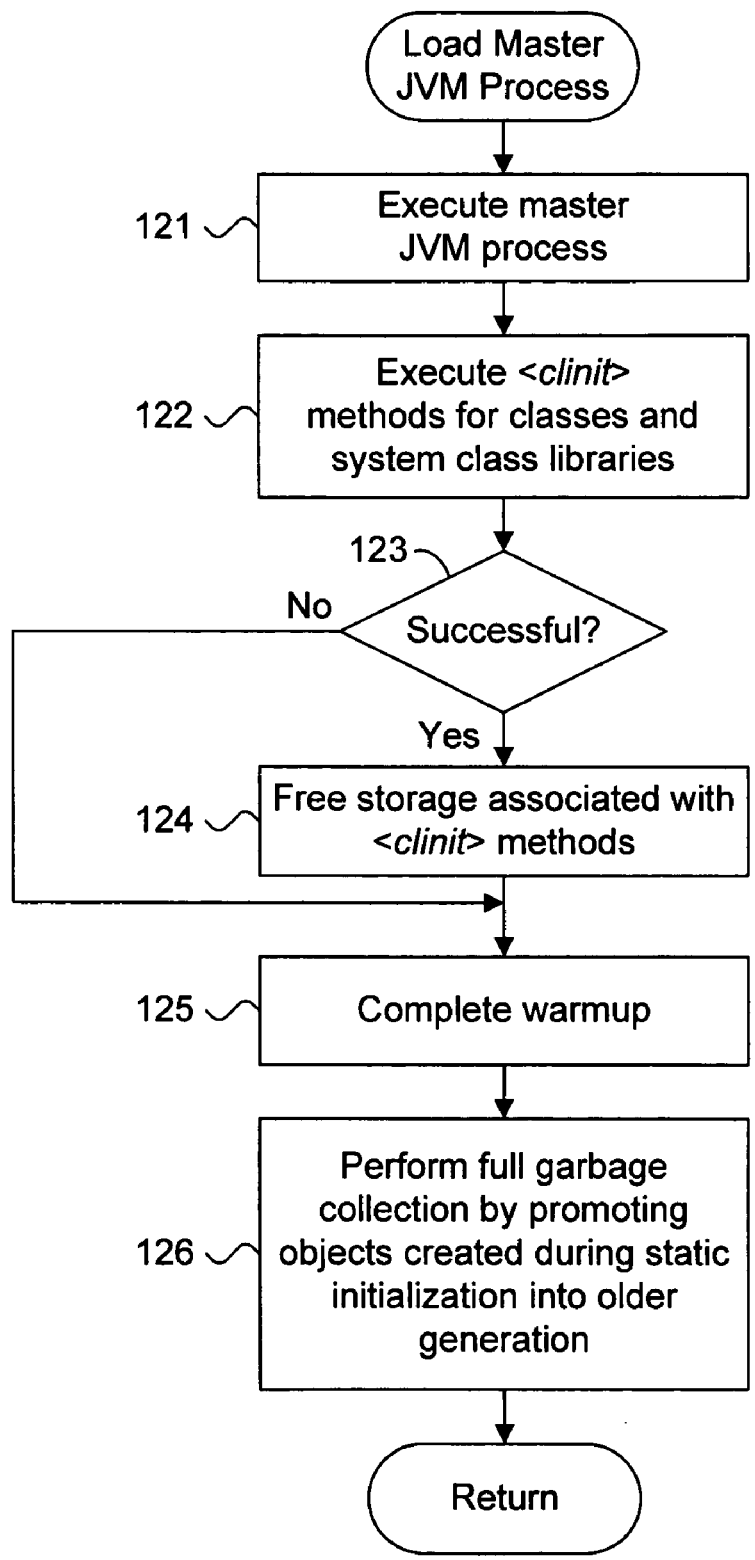
FIG. 7 is a flow diagram showing the routine for loading a master JVM process for use in the method of FIG. 6.

FIG. 7 is a flow diagram showing the routine 120 for loading a master JVM process 33 for use in the method 100 of FIG. 6. One purpose of the routine is to invoke the master JVM process 33 and to execute those static initialization methods defined on classes executed by one or more of the cloned JVM processes 34.

Initially, the master JVM process 33 begins execution at device boot time (block 121). The master JVM process 33 then executes the <clinit> method 39, 40 assigned to each class 36 and class defined in the class libraries 37 (block 122). If static initialization method execution is successful (block 123), the storage associated with each <clinit> method 39, 40 is freed, including code and metadata (block 124). As result, the inherited prewarmed state 43 of each cloned JVM process 34 is reduced. The master JVM process 33 completes any other warmup operations (block 125). In one embodiment, a full garbage collection is performed by promoting objects created during static initialization into the older generation (block 126). The routine then returns.

Routine for Process Cloning without Copy-On-Write

Figure 8:
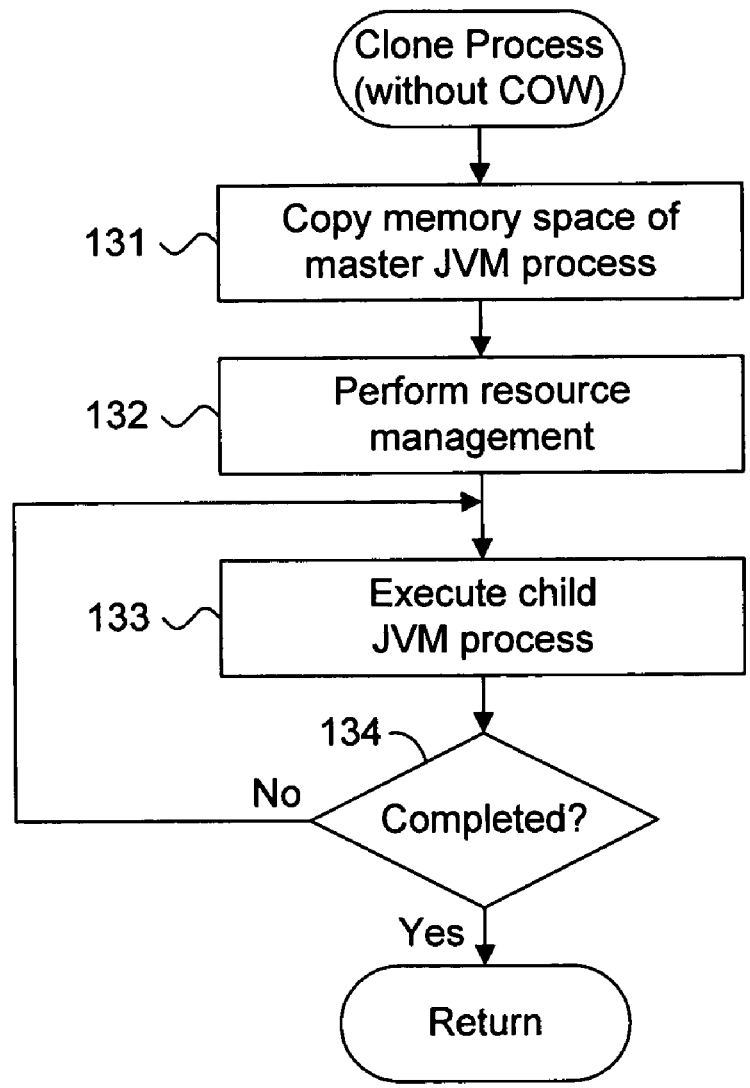
FIG. 8 is a flow diagram showing the routine for cloning a process without copy-on-write semantics for use in the method of FIG. 6.

FIG. 8 is a flow diagram showing the routine 130 for cloning a process without copy-on-write for use in the method 100 of FIG. 6. One purpose of the routine is to create and initiate execution of a cloned JVM process 34 through process cloning that does not provide copy-on-write semantics.

Initially, the memory space containing the context of the master JVM process 33 is physically copied into a new memory space for the cloned JVM process 34 (block 131). Optionally, the master JVM process 33 can set operating system level resource management parameters over the cloned JVM process 34 (block 132), including setting scheduling priorities and limiting processor and memory consumption. Other types of resource management controls are possible. The cloned JVM process 34 is then executed by the runtime environment 31 (block 133) using the duplicated master JVM process context. The routine returns upon the completion (block 134) of the cloned JVM process 34.

Routine for Process Cloning with Copy-On-Write

Figure 9:
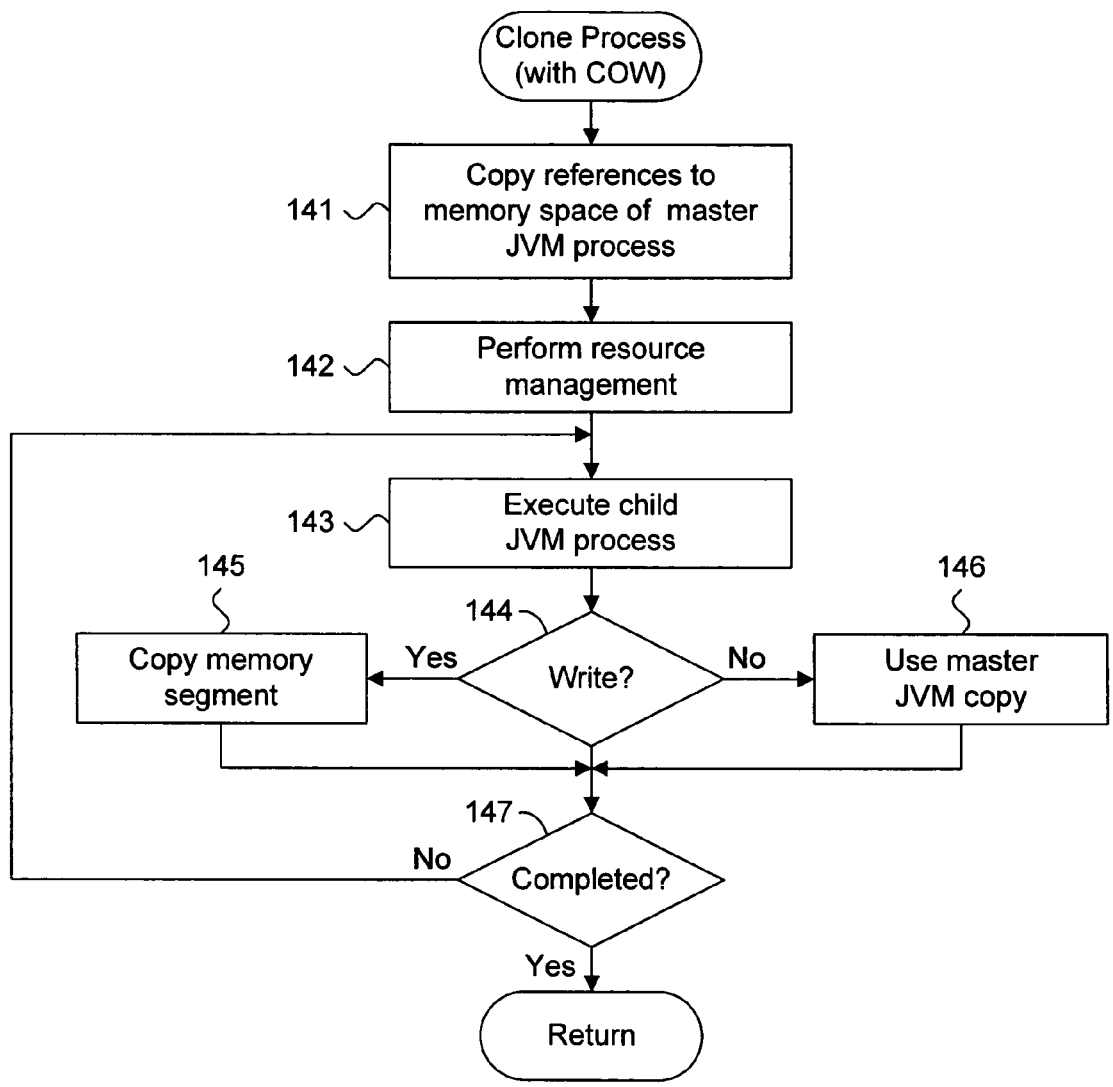
FIG. 9 is a flow diagram showing the routine for cloning a process with copy-on-write semantics for use in the method of FIG. 6.

FIG. 9 is a flow diagram showing the routine 140 for cloning a process with copy-on-write for use in the method 100 of FIG. 6. One purpose of the routine is to create and initiate execution of a cloned JVM process 34 through process cloning that provides copy-on-write semantics.

Initially, references to the memory space containing the context of the master JVM process 33 are copied for the cloned JVM process 34 (block 141). Optionally, the master JVM process 33 can set operating system level resource management parameters over the cloned JVM process 34 (block 142), including setting scheduling priorities and limiting processor and memory consumption. Other types of resource management controls are possible. The cloned JVM process 34 is then executed by the runtime environment 31 (block 143) using the referenced master JVM process context. Each time the cloned JVM process 34 attempts to write into the memory space referenced to the master JVM process context (block 144), the operating system copies the applicable memory segment (block 145). Otherwise, the cloned JVM process 34 continues to use the referenced master JVM process context (block 146), which is treated as read only data. The routine returns upon the completion (block 147) of the cloned JVM process 34.

While the invention has been particularly shown and described as referenced to the embodiments thereof, those skilled in the art will understand that the foregoing and other changes in form and detail may be made therein without departing from the spirit and scope of the invention.

What is claimed is:

1. A system for eliminating static initialization overhead by memory space cloning of a master runtime system process, comprising:
   one or more static initialization methods with each static initialization method being uniquely associated with a class provided in a runtime system and specifying a source definition provided as object-oriented program code;
   a master runtime system process to execute at least one static initialization method in a memory space of the master runtime system process;
   wherein the master runtime system process frees memory used for the at least one static initialization method and initialization metadata after executing the at least one static initialization method; and
   a runtime environment to clone the memory space as a child runtime system process responsive to a process request and to execute the child runtime system process.

2. A system according to claim 1, further comprising:
   a storage manager to free storage allocated to the at least one static initialization method following the interpreting and instantiation of the at least one static initialization method.

3. A system according to claim 1, wherein the master runtime system process and the child runtime system process each provide generational garbage collection over the memory space, further comprising:
   a garbage collector to perform garbage collection over the memory space of the master runtime system process following the interpreting and instantiation of the at least one static initialization method, and to promote any objects created as a result of the execution of the at least one static initialization method.

4. A system according to claim 1, further comprising:
   a data structure to identify the class with which the at least one static initialization method was interpreted and instantiated in the master runtime system process, wherein the child runtime system process skips execution of the identified at least one static initialization method upon using the class.

5. A system according to claim 1, further comprising:
   a process cloning mechanism to instantiate the child runtime system process by copying the memory space of the master runtime system process into a separate memory space for the child runtime system process.

6. A system according to claim 1, further comprising:
a copy-on-write process cloning mechanism to instantiate the child runtime system process by copying references to the memory space of the master runtime system process into a separate memory space for the child runtime system process, and to defer copying of the memory space of the master runtime system process until the child runtime system process needs to modify the referenced memory space of the master runtime system process.

7. A system according to claim 1, wherein the master runtime system process is caused to sleep relative to receiving the process request.

8. A system according to claim 1, further comprising:
a resource controller to set operating system level resource management parameters on the child runtime system process.

9. A system according to claim 1, wherein the object-oriented program code is written in the Java programming language.

10. A system according to claim 9, wherein the master runtime system process and the child runtime system process are Java virtual machines.

11. A method for eliminating static initialization overhead by memory space cloning of a master runtime system process, comprising:
executing a master runtime system process;
identifying one or more static initialization methods with each static initialization method being uniquely associated with a class provided in a runtime system and specifying a source definition provided as object-oriented program code;
executing at least one static initialization method in a memory space of the master runtime system process;
freeing memory used for the at least one static initialization method and initialization metadata after executing the at least one static initialization method; and
cloning the memory space as a child runtime system process responsive to a process request and executing the child runtime system process.

12. A method according to claim 11, further comprising:
freeing storage allocated to the at least one static initialization method following the interpreting and instantiation of the at least one static initialization method.

13. A method according to claim 11, further comprising:
providing generational garbage collection over the memory space of the master runtime system process and the child runtime system process;
performing garbage collection over the memory space of the master runtime system process following the interpreting and instantiation of the at least one static initialization method; and
promoting any objects created as a result of the execution of the at least one static initialization method.

14. A method according to claim 11, further comprising:
identifying the class with which the at least one static initialization method was interpreted and instantiated in the master runtime system process; and
skipping execution of the identified at least one static initialization method upon using the class in the child runtime system process.

15. A method according to claim 11, further comprising:
instantiating the child runtime system process by copying the memory space of the master runtime system process into a separate memory space for the child runtime system process.

16. A method according to claim 11, further comprising:
instantiating the child runtime system process by copying references to the
memory space of the master runtime system process into a separate memory space for the child runtime system process; and
deferring copying of the memory space of the master runtime system process until the child runtime system process needs to modify the referenced memory space of the master runtime system process.

17. A method according to claim 11, further comprising:
causing the master runtime system process to sleep relative to receiving the process request.

18. A method according to claim 11, further comprising:
setting operating system level resource management parameters on the child runtime system process.

19. A method according to claim 11, wherein the object-oriented program code is written in the Java programming language.

20. A method according to claim 19, wherein the master runtime system process and the child runtime system process are Java virtual machines.

21. A computer-readable storage medium holding code for performing the method according to claim 11.

22. An apparatus for eliminating static initialization overhead by memory space cloning of a master runtime system process, comprising:
means for executing a master runtime system process;
means for identifying one or more static initialization methods with each static initialization method being uniquely associated with a class provided in a runtime system and specifying a source definition provided as object-oriented program code;
means for executing at least one static initialization method in a memory space of the master runtime system process;
means for freeing memory used for the at least one static initialization method and initialization metadata after executing the at least one static initialization method; and
means for cloning the memory space as a child runtime system process responsive to a process request and means for executing the child runtime system process.

* * * * *